Aug. 29, 1944.   S. N. WEKEMAN   2,356,960
CAMERA
Filed Aug. 21, 1941   6 Sheets-Sheet 6
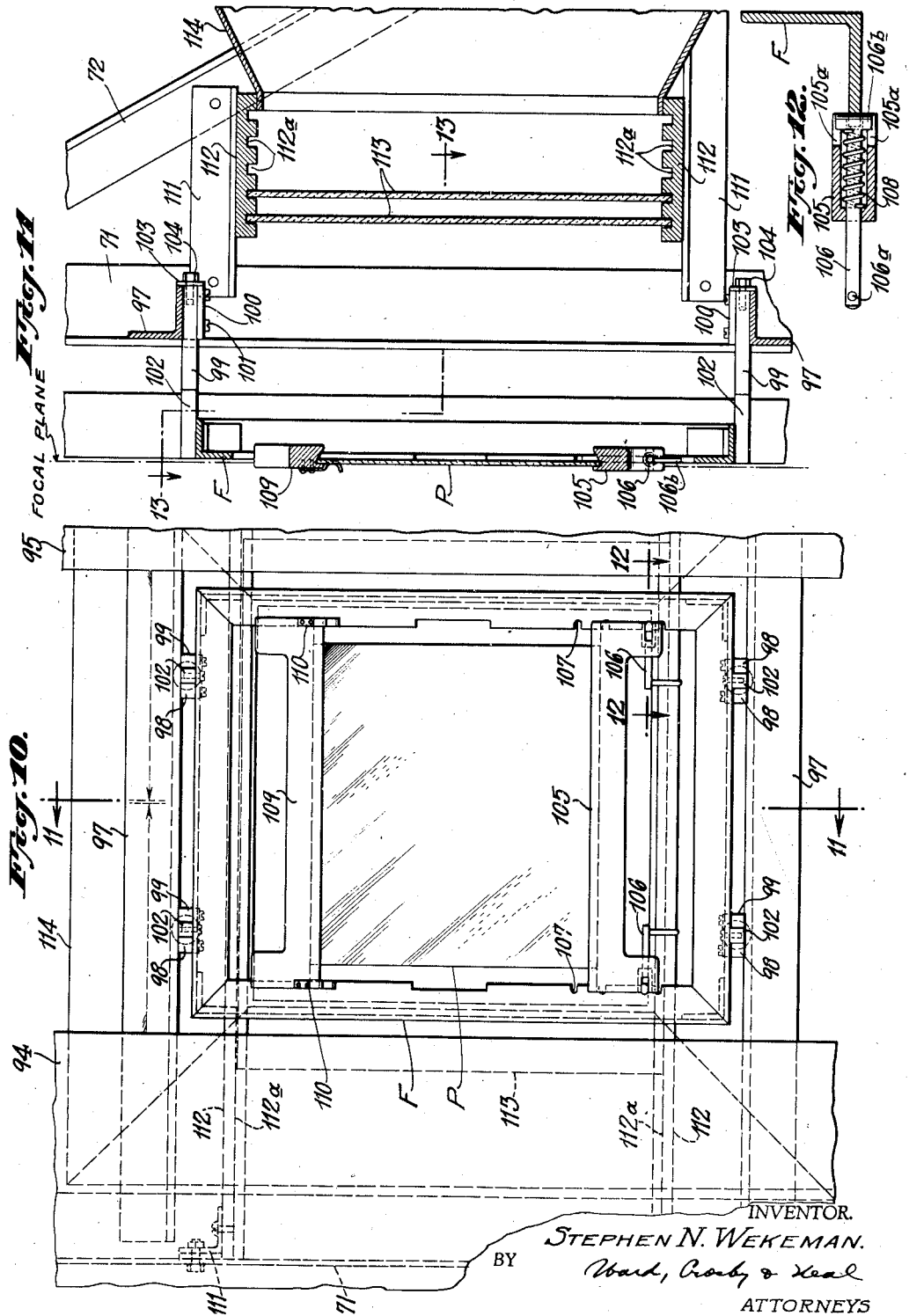
INVENTOR.
STEPHEN N. WEKEMAN.
BY
Ward, Crosby & Neal
ATTORNEYS Patented Aug. 29, 1944

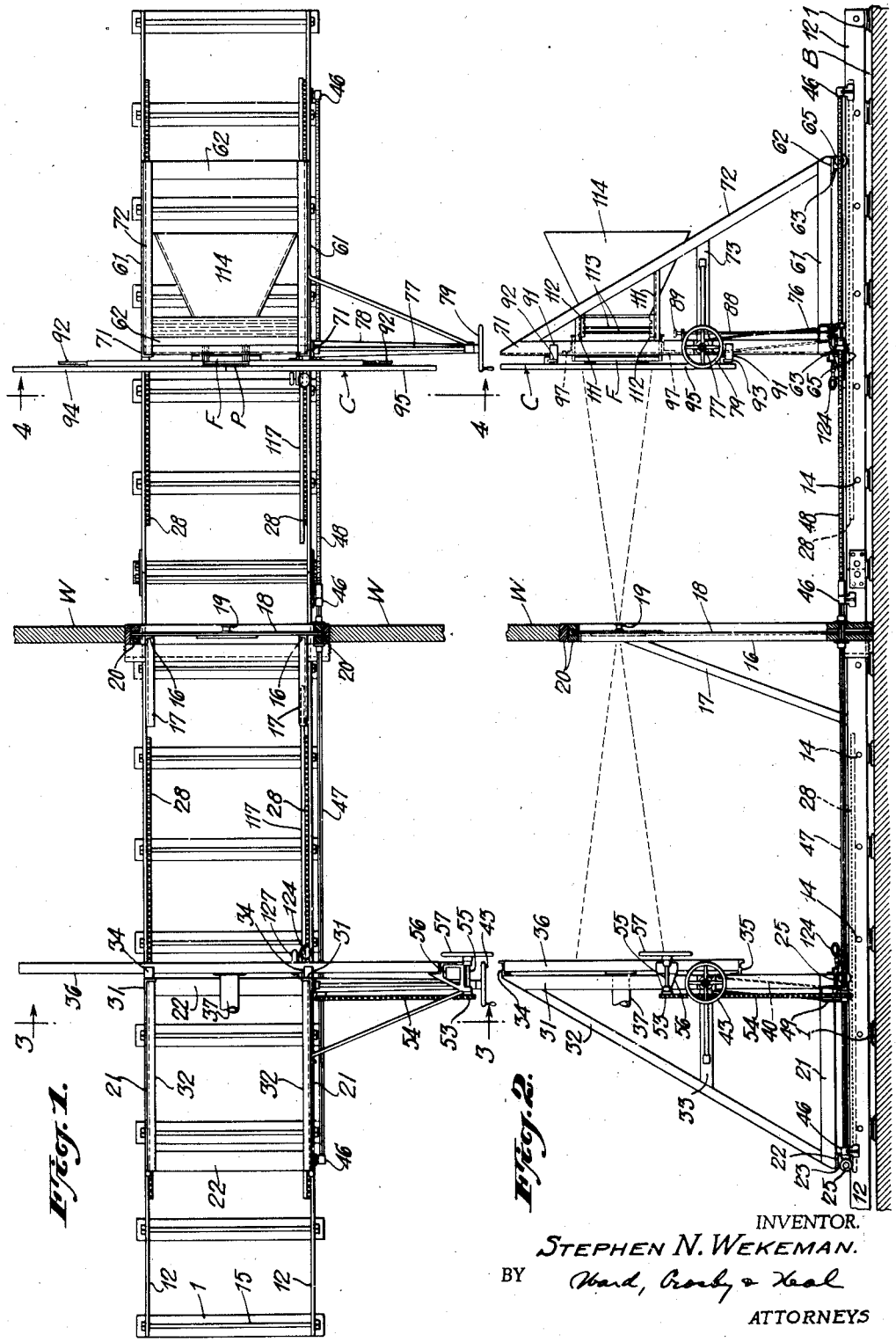

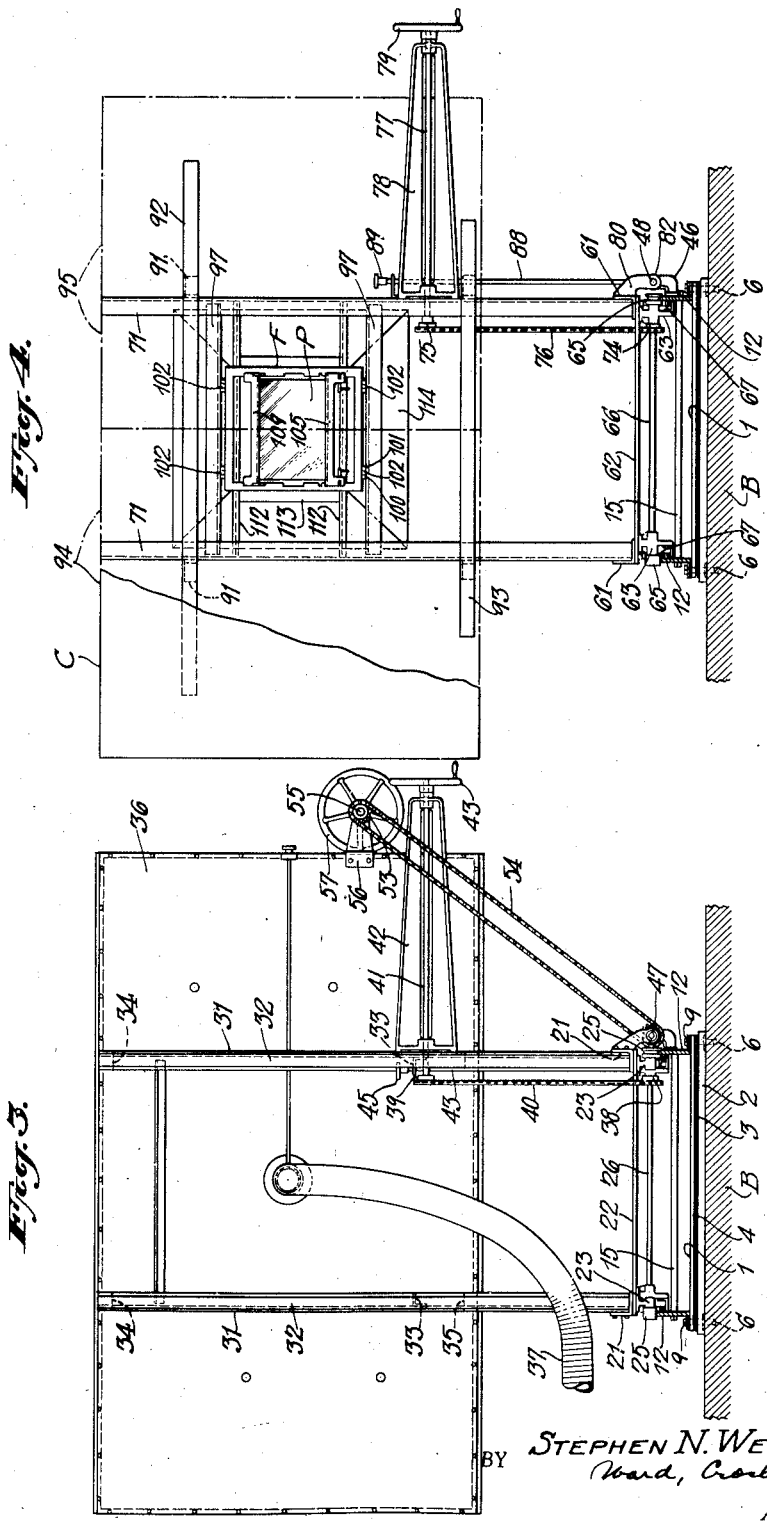

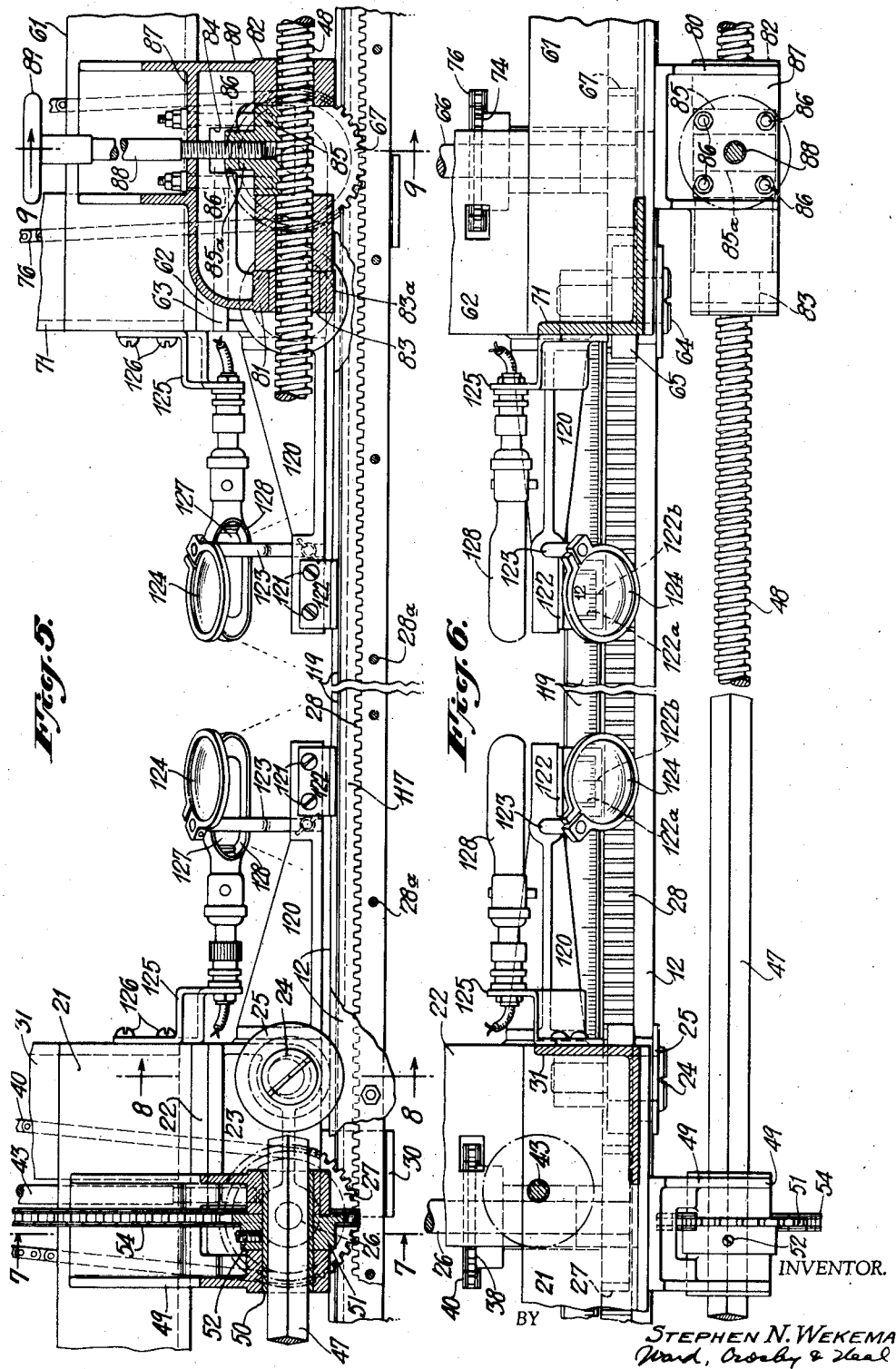

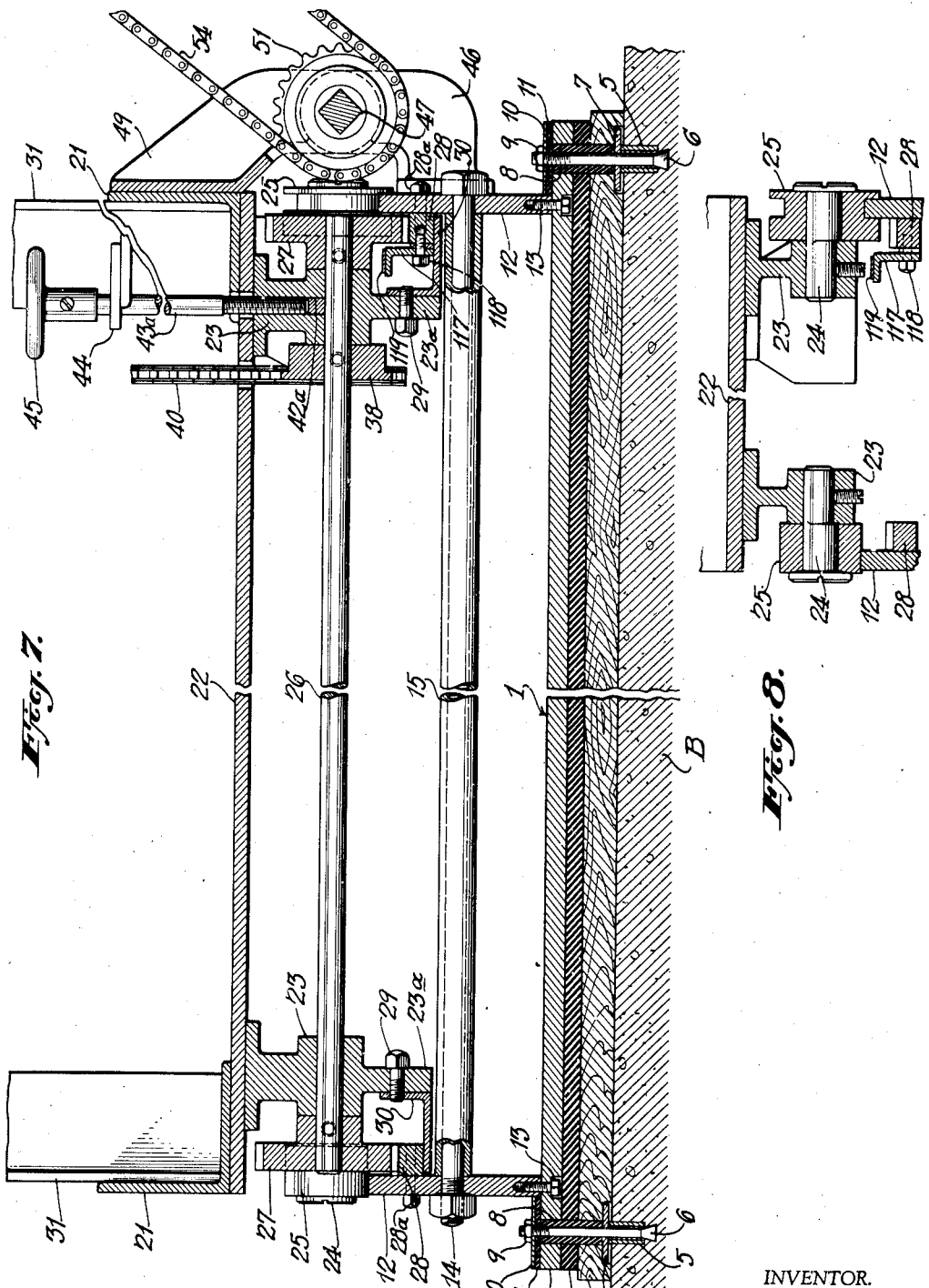

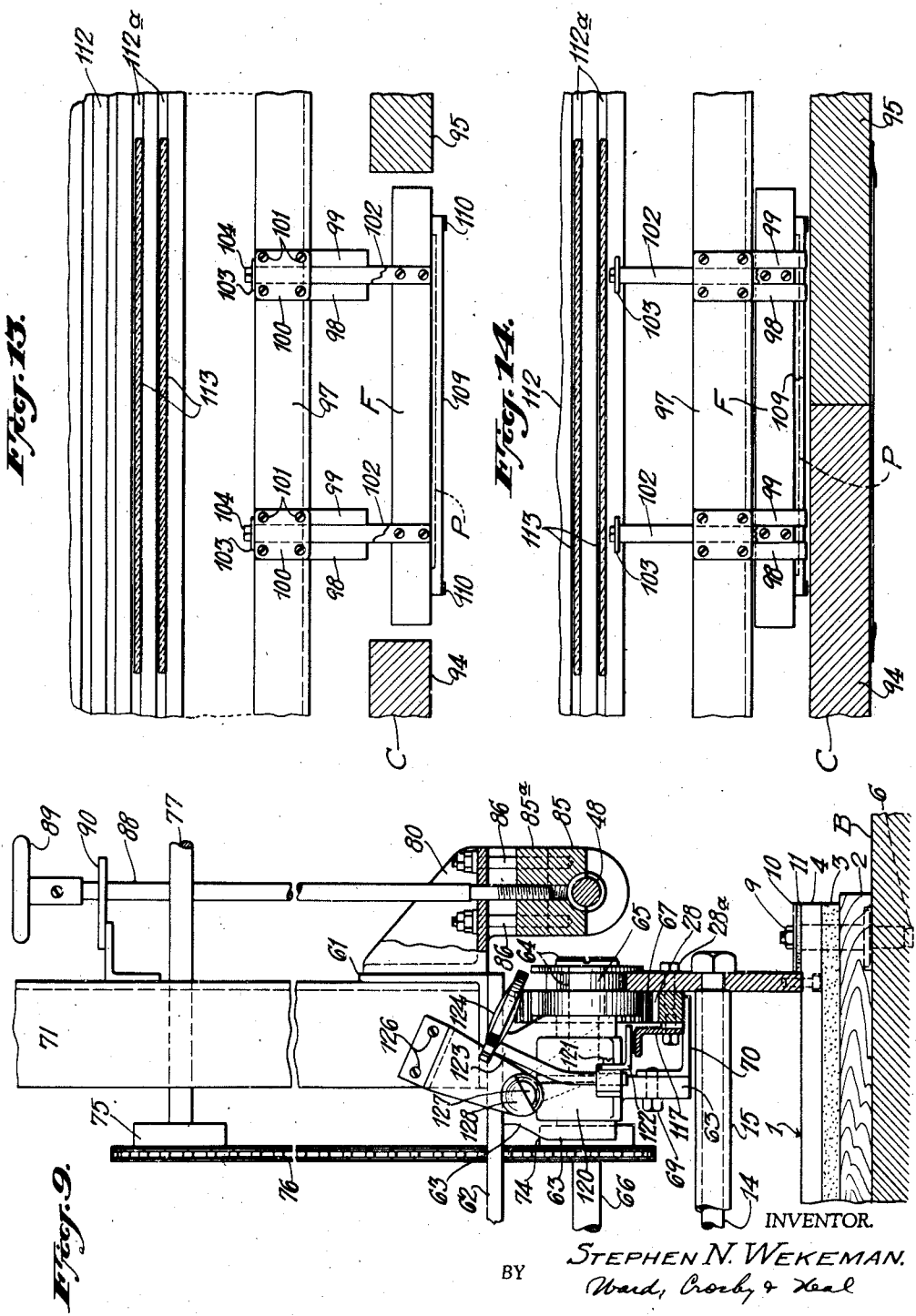

2,356,960

UNITED STATES PATENT OFFICE 2,356,960

CAMERA

Stephen N. Wekeman, Saddle River Township, Bergen County, N. J., assignor to General Printing Ink Corporation, New York, N. Y., a corporation of Delaware Application August 21, 1941, Serial No. 407,723

20 Claims. (Cl. 88—24)

My invention relates to cameras.

In accordance with my invention, a novel arrangement is provided in a camera for effecting relative movement of the respective supporting carriages for the light-sensitive member and the copy board or equivalent, and for effecting movement of each of these carriages with respect to the objective lens of the camera.

Further in accordance with my invention, the camera copy board or a frame carrying a positive or negative plate are maintained alternately in the same focal plane under the control of novel mechanism.

Various other objects, advantages and features of my invention will become apparent from the following detailed description.

My invention resides in the camera, control mechanism, features and combinations of the character hereinafter described and claimed.

For an understanding of my invention and for an illustration of one of the forms thereof, reference is to be had to the accompanying drawings, in which:

Figure 1 is a plan view showing a camera as constructed and supported in accordance with my invention;

Fig. 2 is an elevational view, partly in section, showing the camera of Fig. 1;

Fig. 3 is a transverse vertical sectional view, partly in elevation, taken on the line 3—3 of Fig. 1 looking in the direction of the arrows;

Fig. 4 is a transverse vertical sectional view, partly in elevation, taken on the line 4—4 of Fig. 1 looking in the direction of the arrows;

Fig. 5 is an enlarged elevational view, partly in section, showing detailed features of the invention;

Fig. 6 is a plan view, partly in section, showing the mechanism of Fig. 5;

Fig. 7 is an enlarged, transverse sectional view, partly in elevation, taken on the line 7—7 of Fig. 5 looking in the direction of the arrows;

Fig. 8 is an enlarged, transverse vertical sectional view, partly in elevation, taken on the line 8—8 of Fig. 5 looking in the direction of the arrows;

Fig. 9 is an enlarged, transverse vertical sectional view, partly in elevation, taken on the line 9—9 of Fig. 5 looking in the direction of the arrows;

Fig. 10 is an enlarged elevational view showing the copy holder and negative holder mechanism;

Fig. 11 is a transverse vertical sectional view, partly in elevation, taken on the line 11—11 of Fig. 10 looking in the direction of the arrows;

Fig. 12 is an enlarged horizontal sectional view, partly in elevation, taken on the line 12—12 of Fig. 10 looking in the direction of the arrows;

Fig. 13 is a horizontal sectional view taken on the line 13—13 of Fig. 11 looking in the direction of the arrows; and Fig. 14 is a horizontal sectional view corresponding generally with Fig. 13 but showing some of the parts in different positions.

Referring to Figs. 1, 2 and 7, B represents a floor or other suitable supporting base adapted to support the camera of my invention. The base B supports a plurality of tie structures 1 disposed in parallel relation with respect to each other, each tie structure comprising a lower member 2 formed from wood, or equivalent, and an intermediate resilient member 3 formed from rubber, or equivalent, and an upper member 4 formed from steel or other suitable metallic material.

The tie structures 1, at each end thereof, should be anchored to the base B in any suitable manner and, to this end, there may be utilized an arrangement such as shown in Fig. 7 wherein the base B, beneath the respective opposite ends of each tie structure 1, is shown as having a split sleeve 5 together with an anchor bolt 6 seated therein, the anchor bolt 6 terminating in a lower conical section which coacts with a lower surface of the sleeve 5. Each anchor bolt 6 extends upwardly through a metallic disk 7 and a tubular member 8 formed from rubber or equivalent, the disk 7 being seated in the lower member 2 and the tubular member 8 extending through the members 2, 3 and 4. As shown in Fig. 7, each anchor bolt 6 carries an upper nut member 9 which bears against an upper metallic washer 10 and a lower rubber washer 11.

The above described tie structures 1 support a pair of parallel rails or tracks 12, 12 which are maintained in vertical upstanding relation by bolts 13 seated in the upper member 4 and threaded into the rails 12 at the lower side thereof. The rails 12 are suitably braced by a plurality of bolts 14 and associated spacing sleeves 15 as shown in Fig. 7.

Referring to Fig. 1, members 16, such as angle irons, are shown as upstanding from the respective rails 12 to which they are secured in any suitable manner, said members 16 being suitably braced, as by the inclined members 17, such as angle irons, which are secured thereto, respectively, and to the respective rails 12. Suitably secured to the members 16 is a lens board or plate 18 which, in suitable manner, supports an objective lens 19 having its longitudinal axis disposed horizontally. One wall W of the camera dark room is apertured to receive a frame 20 in which the edges of the lens board 18 are received preferably in non-contacting relation so as to avoid the transmission of vibrations thereto.

As shown in Fig. 1, the rails 12 support a frame formed from the longitudinally extending members 21 disposed in parallel relation and the transverse members 22 likewise disposed in parallel relation, these members 21 and 22 being suitably secured to each other in frame-forming relation so as to form a carriage utilizable as hereinafter described. Each member 22, at each end thereof, has secured thereto in suitable manner a bearing structure 23, Fig. 8, these bearing structures 23 being alined longitudinally and transversely in pairs. Each bearing structure 23 supports an outwardly extending horizontal stud 24 and each stud 24 freely supports a roller 25. As indicated in Fig. 8, the pair of rollers 25 at the left engage the adjacent track 12 in non-grooved relation whereas the pair of rollers 25 at the right are grooved for the reception of the adjacent track 12. A construction of this character prevents movement of the carriage formed by the members 21 and 22 transversely of the rails 12, said carriage, however, being freely movable longitudinally of said rails 12 as hereinafter described.

Journalled in those bearing structures 23 nearer the lens board 18 is a transverse shaft 26, Fig. 7, having gear wheels 27 secured to the respective opposite ends thereof for rotatable movement therewith. The gear wheels 27 mesh with the respective rack members 28 which are suitably secured to the interior surfaces of the rails 12, respectively, as by the screws 28a, Fig. 2. As shown in Fig. 7, each of the bearing structures 23 comprises a depending web section 23a to which, by screws 29, are secured the respective angle members 30, the horizontal sections of which slidably engage the lower surfaces of the respective rack members 28 to thereby prevent tilting movement of the described carriage.

Upstanding from and secured to the aforesaid carriage formed by the members 21 and 22 are a pair of vertical members or standards 31, such as angle irons, these vertical members 31 being braced by the inclined and horizontal members 32 and 33. As shown in Fig. 2, the members 31 carry upper and lower angular members 34 and 35 which form a support for a housing 36 having a conduit 37 opening thereinto. As well understood in the art, that surface of the housing 36 facing the objective lens 19 is provided with a plurality of small apertures whereby a suitable light-sensitive member, not shown, may be held against said surface by action of suction when air is withdrawn from the housing 36 through the conduit 37.

The hereinbefore described shaft 26 has secured thereto a sprocket wheel 38, Figs. 3 and 7, which is disposed in the same vertical plane with a sprocket wheel 39, the sprocket wheels 38 and 39 having an endless sprocket chain 40 coactable therewith. The sprocket wheel 39 is secured to one end of a transverse shaft 41 journaled in bearings formed in a bracket 42 suitably secured to that vertical member 31 toward the right, Fig. 3, the shaft 41, at its end remote from the sprocket wheel 39, carrying an operating hand wheel 43.

As will be understood in view of the foregoing, the hand wheel 43 may be rotated in one direction or the other to transmit rotary movement to the shaft 26 through the described mechanical connections. In response to such rotation of the shaft 26, the gear wheels 27 carried thereby coact with the respective rack members 28 to move the suction housing 36 and the thereby-carried light-sensitive member either toward or from the objective lens 19, the direction of such movement depending upon the direction of rotation of the hand wheel 43.

As shown in Fig. 7, that bearing structure 23 toward the right, the member 22 and the member 21 are provided with a vertical passage disposed directly above the shaft 26. The bottom of this passage loosely receives a plug 42a and the upper part thereof is threaded for the reception of a vertical screw shaft 43a journaled in a bracket 44 carried by the adjacent standard 31, the upper end of the screw shaft 43a carrying a hand wheel 45. After the housing 36 and the light-sensitive member have been moved to a desired position, for example, under the control of the hand wheel 43 as described above, the operator may thread the screw shaft 43a downwardly to thereby clamp the plug 42 against the shaft 26 so as to positively prevent movement of said housing 36 and the light-sensitive member from its selected position.

Referring to Figs. 1 and 2, one of the rails 12 is shown as carrying a plurality of brackets 46 in which is rotatably supported an elongated shaft structure comprising a rod 47 square in cross-section and a screw shaft 48 connected thereto for rotatable movement therewith, the rod 47 and the shaft 48 being utilizable as hereinafter described.

As shown in Figs. 3 and 7, a bracket 49 is suitably secured to one of the standards 31 and to the adjacent rail 12, the bracket 49, as illustrated in Fig. 5, being provided with a horizontal passage lined by a sleeve 50. The aforesaid rod 47 extends through said sleeve 50 which presents an exterior surface circular in cross-section so as to be freely rotatable in the bracket 49 and an interior surface square in cross-section so as to receive the rod 47 in freely slidable relation.

As illustrated in Fig. 5, the bracket 49 is bifurcated for the reception of a sprocket wheel 51 through which the sleeve 50 extends, said sleeve and the hub of the sprocket wheel 51 being connected together for rotatable movement as a unit by a set screw 52.

Disposed in the same vertical plane as the sprocket wheel 51 is a sprocket wheel 53, Fig. 2, the sprocket wheels 51 and 53 having an endless sprocket chain 54 coactable therewith. The sprocket wheel 53 is carried by and rotatable with a shaft 55 journaled in a bearing bracket 56 secured to the aforesaid housing 36. The end of the shaft 55 opposite the sprocket wheel 53 carries a hand wheel 57.

As will be understood in view of the foregoing, rotation of the hand wheel 57 in one direction or the other, through the described mechanical connections, produces rotatable movement of the rod 47 and such rotatable movement is transmitted to the screw shaft 48 for a purpose hereinafter to be described.

Referring to Figs. 1 and 2, the rails 12 are shown as supporting a frame formed from the longitudinally extending members 61 disposed in parallel relation and the transverse members 62 likewise disposed in parallel relation, these members 61 and 62 being suitably secured to each other in frame-forming relation so as to form a carriage utilizable as hereinafter described.

As indicated in Figs. 2, 4 and 9, the carriage described immediately above, the same as the hereinbefore described carriage formed by the members 21 and 22, is supported by bearing structures 63, studs 64, and rollers 65, pairs of the latter engaging the respective rails 12. Therefore, the carriage formed by the members 61 and 62 is freely movable longitudinally of the rails 12 while being prevented from moving transversely thereof.

Journaled in those bearing structures 63 nearer the lens board 18 is a transverse shaft 66, Fig. 9, having gear wheels 67 secured to the respective opposite ends thereof for rotatable movement therewith. The gear wheels 67 mesh with the aforesaid rack members 28, respectively. As indicated in Fig. 9, each of the bearing structures 63 comprises a depending web section 63a to which, by screws 69, are secured the respective angle members 70, the horizontal sections of which slidably engage the lower surfaces of the respective rack members 28 to thereby prevent tilting movement of the carriage formed by the members 61 and 62.

Upstanding from and secured to the aforesaid carriage formed by the members 61 and 62 are a pair of vertical members or standards 71, such as angle irons, these vertical members 71 being braced by the inclined and horizontal members 72 and 73, Fig. 2.

As shown in Fig. 9, the hereinbefore described shaft 66 has secured thereto a sprocket wheel 74 which is disposed in the same vertical plane with a sprocket wheel 75, the sprocket wheels 74 and 75 having an endless sprocket chain 76 coactable therewith. The sprocket wheel 75 is secured to one end of a transverse shaft 77 journaled in bearings formed in a bracket 78 suitably secured to that vertical member 71 toward the right, Fig. 4, the shaft 77, at its end remote from the sprocket wheel 75, carrying an operating hand wheel 79.

As will be understood in view of the foregoing, the hand wheel 79 may be rotated in one direction or the other to transmit rotary movement to the shaft 66 through the described mechanical connections. In response to such rotation of the shaft 66, the gear wheels 67 coact with the respective rack members 28 to move the carriage formed by the members 61 and 62 either toward or from the objective lens 19, the direction of such movement depending upon the direction of rotation of the hand wheel 79.

Referring to Figs. 5, 6 and 9, a bracket 80 is shown as secured to that longitudinal carriage member 61 toward the right, Fig. 9. This bracket comprises two depending sections 81 and 82 provided, respectively, with horizontal passages disposed in alinement. The passage in the bracket section 81 is somewhat larger than the external diameter of the screw shaft 48 and said last named passage has disposed therein a tubular sleeve 83 formed integrally with a bearing section 83a, said sleeve 83 and the bearing section 83a having alined horizontal passages which are alined with the horizontal passage through the bracket section 82. The screw shaft 48 extends through all of these alined passages in non-binding relation with respect thereto.

As shown in Fig. 5, the bracket 80 comprises a transverse channel 84 which slidably receives the upper vertical extension 85a of a half-nut 85 having threads corresponding with those of the screw shaft 48. The half-nut 85 is supported between the facing surfaces of the bracket section 82 and the sleeve bearing section 83a. Further, the half-nut 85 is guided for vertical movement by a plurality of members 86 secured thereto and extending vertically through passages provided respectively therefor in a horizontal section 87 of the bracket 80, the members 86 extending loosely through the respective passages.

In order to move the half-nut 85 either into coacting relation with the screw shaft 48 or to space the same therefrom, a shaft 88 carrying a hand wheel 89 is mounted for rotatable movement only in a bracket 90 secured to the adjacent standard 71. The shaft 88 is provided with a threaded lower end which coacts with a threaded passage vertically formed in the half nut 85.

It was stated above that rotation of the hand wheel 57 in one direction or the other produces rotatable movement of the rod 47 and the screw shaft 48. With the half-nut 85 engaged with the screw shaft 48 as shown in Figs. 5 and 9, the rotatable movement thus imparted to the screw shaft 48 effects movement of the carriage formed by the members 61 and 62 along the rails 12 in a direction either toward or from the objective lens 19 depending upon the direction of rotation of said hand wheel 57.

It will be understood that, when the carriage formed by the members 61 and 62 is to be moved in response to rotation of the hand wheel 79, the half-nut 85, necessarily, is disengaged from the screw shaft 48. This is effected by rotating the hand wheel 89, Fig. 9, in the proper direction to elevate said half-nut 85 from the screw shaft 48.

Referring to Figs. 2 and 4, the above described vertical standards 71 are shown as having members 91 suitably secured thereto, the pair of upper members 91 supporting an upper horizontal bar 92 and the pair of lower members 91 supporting a lower horizontal bar 93. These bars 92 and 93 are adapted to support a copy board C disposed in a vertical plane, said copy board C, in the form of the invention herein shown, comprising a pair of plates 94 and 95 each of which carries angle members 96 adapted to engage and be supported by the respective bars 92, 93.

With an arrangement of the character described, the plates 94 and 95 may readily be closed upon each other as shown in Fig. 1 so that the copy board C presents a continuous, uninterrupted surface. However, if desired, the copy board plates 94, 95 may be moved apart manually to the position shown in Fig. 10 for a purpose hereinafter to be described.

Referring particularly to Figs. 10 and 11, the aforesaid vertical standards 71 are indicated as carrying upper and lower horizontal members 97, these, preferably, being angle members which are welded or otherwise suitably secured to the standards 71.

Secured to the lower surface of the upper member 97 are two supporting arrangements each of which comprises two bars 98 and 99 together with a plate 100, bolts or screws 101 securing the bars 98, 99 and the plate 100 in position as shown. Each supporting arrangement further comprises a movable bar 102 disposed between the bars 98, 99 and adapted to rest upon the plate 100, the bar 102 carrying a stop washer 103 held in position by a screw 104.

As illustrated, the upper surface of the lower member 97 carries two supporting arrangements similar to those described above, all of said supporting arrangements, preferably, being alined vertically in pairs as shown.

The movable bars 102 support a four-sided frame F disposed in a vertical plane, said bars 102 being welded or otherwise suitably secured to said frame F.

Slidably associated with the vertical sides of the frame F is a lower supporting member 105 which, in a depending extension at each lower side thereof, carries a locking pin 106 having a handle 106a. As indicated in Fig. 12, each side of each extension is of channel configuration, the channel sides being slotted as indicated at 105a and the rear channel wall having a passage therein through which the aforesaid pin 106 freely extends. The pin 106, at the end thereof opposite the handle 106a, terminates in a transverse locking section 106b coactable with one of a plurality of slots 107 formed in the adjacent side of the frame F, the pin 106 being biased in a direction from left to right, Fig. 12, by a helical spring 108. In view of the foregoing description, it will be understood that the locking pins 106 may be retracted whereupon the supporting member 105 may be moved to a desired vertical position and releasably retained in said position by reason of the engagement effected between the respective locking pin sections 106b and a pair of the slots 107.

In addition to the above described member 105, there is slidably associated with the vertical sides of the frame F an upper supporting member 109 which, at each end thereof, is of channel-configuration so as to slidably embrace the respective vertical frame sides. Each end of the member 109 carries a spring member 110 which engages the adjacent frame surfaces under pressure.

With an arrangement of the character described, it will be understood that the members 105 and 109 may be separated to a desired extent whereupon a light-passing representation-bearing plate P may be positioned in the seat provided on the member 109. Thereafter, the member 109 may be moved downward into engagement with the plate P so as to hold the same in operative position. As will be obvious, the member 105 may be moved upwardly or downwardly as desired, after the pins 106 have been retracted, to thereby position the plate P at a desired elevation.

Referring further to Figs. 10 and 11, the vertical standards 71 are indicated as carrying upper and lower horizontal members 111 which are alined in horizontal pairs. Each pair of these members carries a member 112 and, on the surfaces facing each other, the members 112 are provided with vertically alined pairs of slots 112a adapted to receive light-filtering plates 113 formed from glass. Further, as illustrated, the members 112 serve as the support for a conical structure 114 coactable with a source of light, not shown, for directing a projecting light beam through the plate P.

Referring to Figs. 7 and 9, the hereinbefore described rack member 28 toward the right has longitudinally extending angle members 117 secured thereto by screws 118, these angle members 117 being disposed at opposite sides of the lens board 18. The horizontal section of each angle member 117 has a scale 119 suitably secured to the upper surface thereof.

As shown in Figs. 5, 6 and 9, a bracket 120, projecting toward the objective lens, is suitably secured to that bearing structure 63 which is disposed above the aforesaid rack member 28 at the side of the carriage formed by the members 61 and 62 facing the objective lens. Secured to the end of this bracket 120, by screws 121, is a plate 122 disposed above the adjacent scale 119, the plate 122 being apertured at 122a so that the scale may be viewed and said plate 122 having an index mark 122b formed thereon. The bracket 120 also supports an upstanding member 123 carrying a magnifying lens 124 focused on any section of the scale 119 which is disposed beneath the plate opening 122a.

Further, as shown in said Figs. 5, 6 and 9, a second bracket 125 is secured by screws 126 to that standard 71 which extends upwardly from the bearing structure 63 last noted. The bracket 125 supports a lamp bulb 127 with which is associated a casing 128 serving to direct the light rays downwardly onto the scale 119.

With an arrangement of the character described, it will be understood that the index mark 122b, during movement of the carriage formed by the members 61 and 62, coacts with the illuminated scale 117 to furnish exact information concerning the focal plane of the copy board C with respect to the objective lens.

As shown, the carriage formed by the members 21 and 22 has an indexing, lighting and magnifying lens arrangement attached thereto which is a duplicate of the arrangement described above. Accordingly, the same reference characters have been applied to corresponding parts. In connection with the carriage formed by the members 21 and 22, it should be noted that the bracket 120 is attached to that bearing structure 23 which faces the objective lens and which is disposed above the last named rack member 28. Likewise, it should be noted that the bracket 125 is secured to that standard 31 of said last named carriage which extends above said bearing structure 23.

With the plates 94 and 95 closed upon each other to form the copy board C as hereinbefore described, a sheet showing a desired representation may be suitably secured to that surface of the copy board which faces the objective lens 19. Thereafter, by rotation of the hand wheels 43 and 57, or 43 and 79, the copy board C and the operative face of the housing 36 may be moved desired distances toward or from each other to produce a sharply focused image of the desired dimensions in the plane of said operative face of the housing 36. Thereafter, with a light-sensitive member secured to said face of the housing 36 and, with the representation on the copy board C properly illuminated, the camera may be operated to produce a latent image on said light-sensitive member of said representation on the copy board C.

When the copy board C is positioned as described above, the mechanism for supporting a plate P is in a retracted position as indicated in Fig. 14. In case it should be desired to operate the camera as a projector, the copy board plates 94 and 95 are separated as indicated in Figs. 10 and 13. Thereupon, the frame F is moved to the position shown in Fig. 11, this position being determined when the washers 103 engage the rear surfaces of the respective sets of members 97 and 100. With the frame F positioned as last described, the plate P carried by the members 105 and 109 occupies the same focal plane as the focal plane of the copy board C. With an arrangement of the character last described, it will be understood that the projecting light beam passes from right to left, Fig. 11, through the light-filtering plates 113 and then through the plate P. Thereafter, the projecting light beam passes from right to left, Figs. 1 and 2, through the objective lens 19 and then engages the light-sensitive member on the operative face of the housing 36.

In view of the foregoing, it will be understood that an important feature of my invention relates to the control which may be effected by an operator standing in the dark room beside the suction housing 36. This operator may rotate the hand wheel 43 to move the suction housing 36 and the thereby-carried light-sensitive member either toward or from the objective lens as desired. At the same time and without changing his position, the operator may rotate the hand wheel 57 to move the carriage formed by the members 61 and 62 together with the copy board C and associated mechanism either toward or from the objective lens. Alternatively, the operator may stand beside the carriage last noted and rotate the hand wheel 79 to effect desired movements of said last named carriage.

Another important feature of the invention relates to the mechanism associated with the carriage which carries the copy board C for shifting the frame F into the plane of the copy board after the members 94 and 95 forming the same have been moved into open position as shown in Fig. 10.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a camera of the character described, horizontal guiding means, a lens board and an associated objective lens disposed between the ends of said guiding means, carriages disposed on said guiding means at the respective opposite sides of said lens board, one of said carriages being adapted to support a light-sensitive member and the other of said carriages being adapted to support a member from which an image is to be obtained, and means carried by and movable with the respective carriages for moving either of them with respect to the other carriage and with respect to said lens board.

2. In a camera of the character described, horizontal guiding means, a lens board and an associated objective lens disposed between the ends of said guiding means, carriages disposed on said guiding means at the respective opposite sides of said lens board, one of said carriages being adapted to support a light-sensitive member and the other of said carriages being adapted to support a member from which an image is to be obtained, and means carried by and movable with the respective carriages for moving either of them with respect to the other carriage and with respect to said lens board, the space between said light-sensitive member and said lens board on the one hand and the space between said other member and said lens board on the other hand being free and unobstructed so that said carriages may be moved to a desired extent toward and from said lens board.

3. In a camera of the character described, horizontal guiding means, a lens board and an associated objective lens disposed between the ends of said guiding means, carriages disposed on said guiding means at the respective opposite sides of said lens board, said carriages being of duplicate character and each comprising upstanding vertical members braced by sloping members, one of said carriages being adapted to support a light-sensitive member and the other of said carriages being adapted to support a member from which an image is to be obtained, and means carried by and movable with the respective carriages for moving either of them with respect to the other carriage and with respect to said lens board.

4. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, means carried by and movable with said first named carriage for moving said second named carriage with respect to said lens board, and means carried by and movable with said second named carriage for moving the same with respect to said lens board.

5. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, means carried by and movable with said first named carriage for moving said second named carriage with respect to said lens board, said first named moving means and said second named moving means comprising hand wheels disposed closely adjacent each other at the side of the support for said light-sensitive member, and means carried by and movable with said second named carriage for moving the same with respect to said lens board.

6. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, means carried by and movable with said first named carriage for moving said second named carriage with respect to said lens board, said last named means comprising an operating shaft, an endless operating member and a shaft extending along said guiding means from said endless member to said second named carriage, and means carried by and movable with said second carriage for moving the same with respect to said lens board.

7. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, means carried by and movable with said first named carriage for moving said second named carriage with respect to said lens board, said last named means comprising an operating shaft having a hand wheel, a shaft comprising a threaded shaft section extending along said guiding means to said second named carriage, an endless member connecting said shafts, means for connecting said second named carriage to said threaded shaft section and means for disengaging said connecting means from said threaded shaft section, and means carried by and movable with said second named carriage for moving the same with respect to said lens board.

8. In a camera of the character described, a lens board and an objective lens carried thereby, guiding means horizontally disposed at one side of said lens board, a carriage disposed on said guiding means, said carriage being adapted to support a member from which an image is to be obtained, a shaft extending along said guiding means from the camera dark room to said carriage, means in the camera dark room for rotating said shaft to effect movement of said carriage toward or from said lens board, clutch means operable to disconnect said carriage from said shaft, means for effecting movement of said carriage toward or from said lens board while said shaft remains stationary, and means carried by and movable with said carriage for operating said last named means.

9. In a camera of the character described, a lens board and an objective lens carried thereby, guiding means horizontally disposed at one side of said lens board, a carriage disposed on said guiding means, said carriage being adapted to support a member from which an image is to be obtained, a shaft extending along said guiding means from the camera dark room to said carriage, said shaft comprising a threaded section extending throughout the range of movement of said carriage, a member carried by said carriage and disposed in driven relation with respect to said threaded shaft section, means in the camera dark room for rotating said shaft, means for disengaging said driven member from said shaft section, and means for moving said carriage toward or from said lens board while said driven member is disengaged from said shaft section, said last named means being carried by and movable with said carriage.

10. In a camera of the character described, a lens board and an objective lens carried thereby, guiding means horizontally disposed at one side of said lens board, a carriage disposed on said guiding means, said carriage being adapted to support a member from which an image is to be obtained, a shaft extending along said guiding means from the camera dark room to said carriage, said shaft comprising a threaded section extending throughout the range of movement of said carriage, a half-nut carried by said carriage and disposed in threaded relation with respect to said threaded shaft section, means in the camera dark room for rotating said shaft, a shaft for disengaging said half-nut from said shaft section, and means comprising rack and pinion mechanism for moving said carriage toward or from said lens board while said half-nut is disengaged from said shaft section, said last named means being carried by and movable with said carriage.

11. In a camera, a copy board formed from a pair of members disposed in the focal plane of the camera objective lens, means whereby said members may be separated to form a gap therebetween, a frame adapted to carry a representation-bearing plate, means supporting said frame for movement of said plate toward and into said gap, and stop means for discontinuing movement of said supporting means when said plate reaches said focal plane.

12. In a camera, a copy board formed from a pair of members disposed in the focal plane of the camera objective lens, said members being disposed in a vertical plane, means whereby said members may be moved horizontally to form a gap therebetween, a frame adapted to carry a representation-bearing plate, means supporting said frame for movement of said plate toward and into said gap, and stop means for discontinuing movement of said supporting means when said plate reaches said focal plane.

13. In a camera, a carriage comprising a pair of vertical standards, a copy board formed from a pair of members disposed in the focal plane of the camera objective lens, said members being disposed in a vertical plane, track means associated with said standards for supporting said members for movement horizontally to form a gap, a frame adapted to carry a representation-bearing plate, means associated with said standards for supporting said frame for movement of said plate toward and into said gap, and stop means for discontinuing movement of said supporting means when said plate reaches said focal plane.

14. In a camera, a carriage comprising a pair of vertical standards, a copy board formed from a pair of members disposed in the focal plane of the camera objective lens, said members being disposed in a vertical plane, track means associated with said standards for supporting said members for movement horizontally to form a gap, a frame adapted to carry a representation-bearing plate, means associated with said standards for supporting said frame for movement of said plate toward and into said gap, stop means for discontinuing movement of said supporting means when said plate reaches said focal plane, and light-filtering means together with a conical light-directing structure carried by said standards.

15. In a camera, a carriage comprising a pair of vertical standards, a copy board formed from a pair of members disposed in the focal plane of the camera objective lens, said members being disposed in a vertical plane, track means associated with said standards for supporting said members for movement horizontally to form a gap, a frame adapted to carry a representation-bearing plate, means associated with said standards for supporting said frame for movement of said plate toward and into said gap, said last named means comprising slidable members connected to said frame, supports for the respective slidable members connected to said standards, and stop means for limiting movement of said slidable members.

16. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, and means carried by and movable with said first named carriage for moving said second named carriage with respect to said lens board.

17. In a camera of the character described, a lens board and an objective lens carried thereby, guiding means horizontally disposed on opposite sides of said lens board, a carriage disposed on said guiding means at one side of said lens board, said carriage being adapted to support a light-sensitive member, a carriage disposed on said guiding means at the other side of said lens board, said second named carriage being adapted to support a member from which an image is to be obtained, means carried by and movable with said first named carriage for moving the same with respect to said lens board, and means carried by and movable with said first named carriage for moving said second named carriage with respect to said lens board, said first named moving means and said second named moving means comprising hand wheels disposed closely adjacent each other at the side of the support for said light-sensitive member.

18. In a camera, a copy board formed from a pair of members disposed in the focal plane of the camera objective lens, means whereby said members may be separated to form a gap therebetween, a frame adapted to carry a representation-bearing plate, and means supporting said frame for movement of said plate toward and into said gap whereby said plate may be positioned in said focal plane.

19. In a camera of the character described, a lens board and an objective lens carried thereby, guiding means horizontally disposed at one side of said lens board, a carriage disposed on said guiding means, said carriage being adapted to support a member from which an image is to be obtained, means extending along said guiding means from the camera dark room to said carriage, means in the camera dark room for operating said extending means to effect movement of said carriage toward or from said lens board, means for disconnecting said extending means from said carriage, means independent of said extending means for effecting movement of said carriage toward or from said lens board while said extending means remains stationary, and means carried by and movable with said carriage for operating said last named means.

20. In a camera of the character described, a lens board and an objective lens carried thereby, guiding means horizontally disposed at one side of said lens board, a carriage disposed on said guiding means, said carriage being adapted to support a member from which an image is to be obtained, a screw shaft extending along said guiding means from the camera dark room to said carriage, means in the camera dark room for rotating said shaft to effect movement of said carriage toward or from said lens board, clutch means operable to disconnect said carriage from said shaft, said clutch means comprising a half-nut mounted on said carriage for movement toward and from said screw shaft and an operating member coactable with said half-nut for effecting such movement, means for effecting movement of said carriage toward or from said lens board while said shaft remains stationary, and means carried by and movable with said carriage for operating said last named means.

STEPHEN N. WEKEMAN